Nov. 12, 1940.                M. A. HOPKINS                2,221,542
                      STORAGE BATTERY CONSTRUCTION
                        Filed April 20, 1936          2 Sheets-Sheet 1
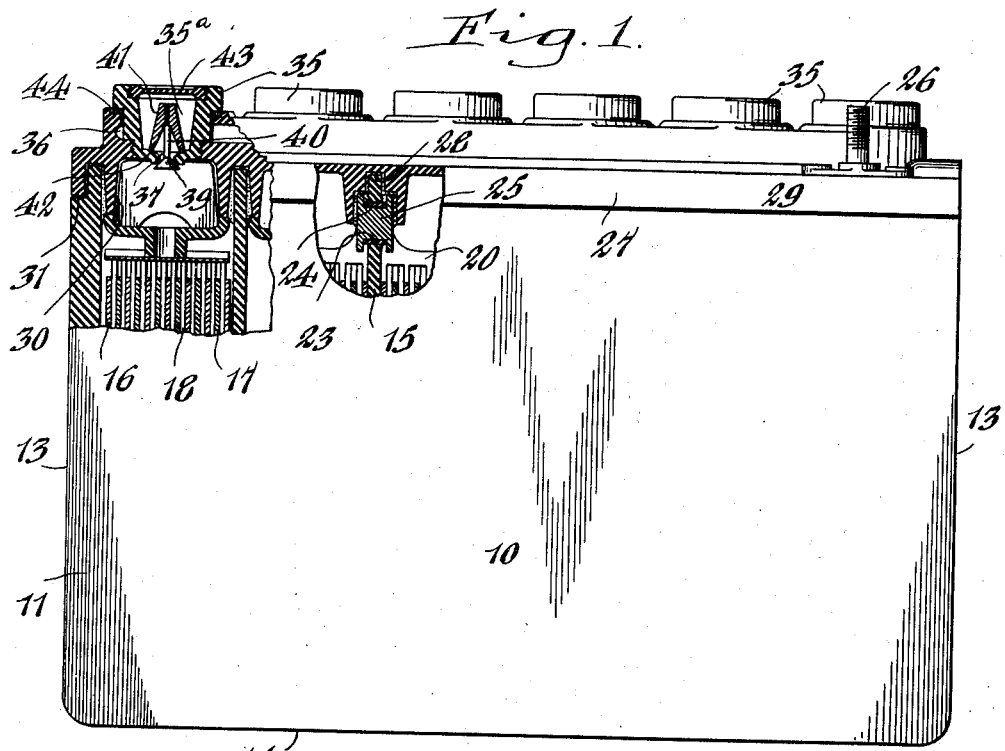
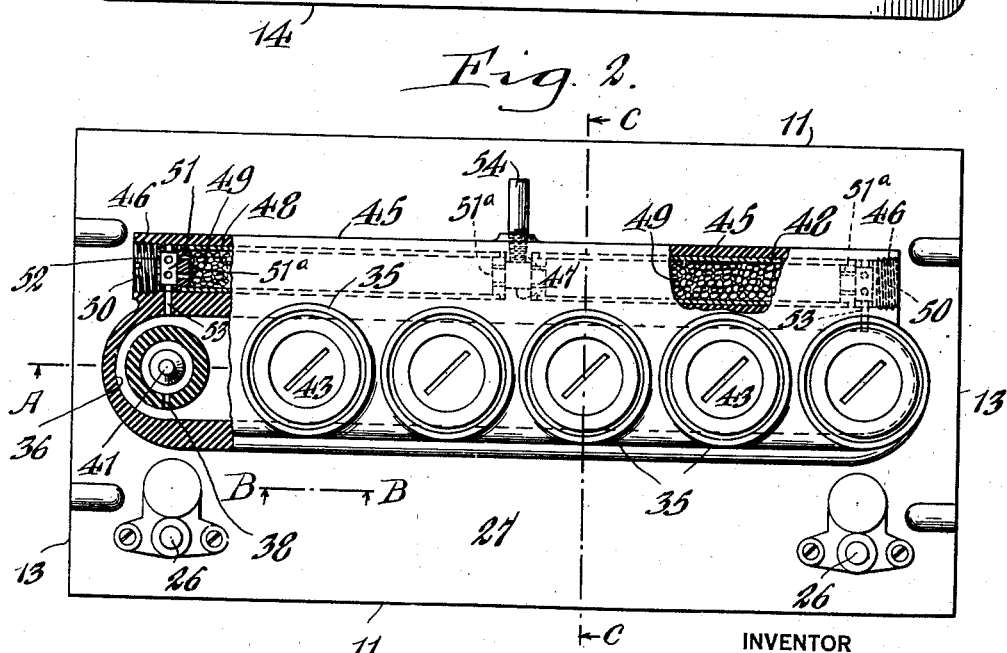
INVENTOR
Mark A. Hopkins
BY
ATTORNEY Nov. 12, 1940.  M. A. HOPKINS  2,221,542
STORAGE BATTERY CONSTRUCTION
Filed April 20, 1936   2 Sheets-Sheet 2
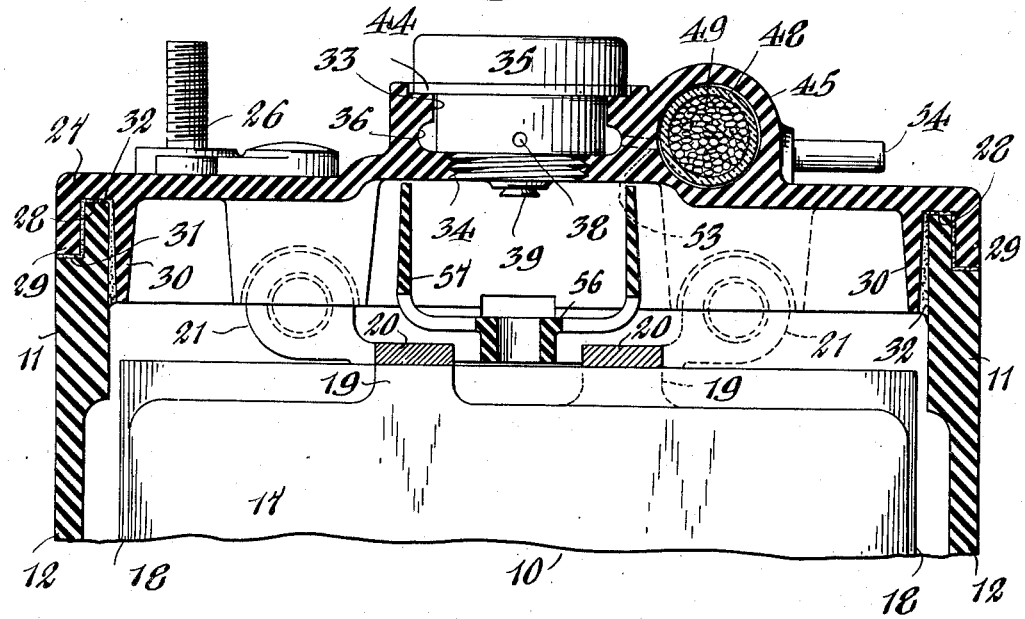
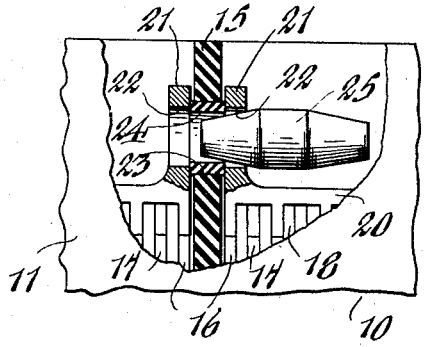
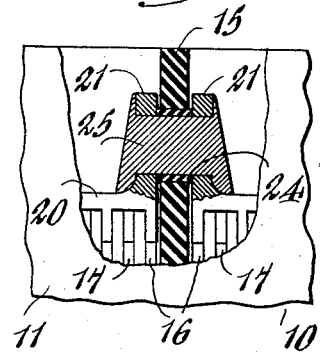
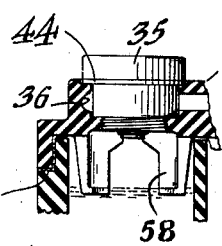
INVENTOR
Mark A. Hopkins
BY
George H. Souther
ATTORNEY Patented Nov. 12, 1940

2,221,542

UNITED STATES PATENT OFFICE 2,221,542

STORAGE BATTERY CONSTRUCTION

Mark A. Hopkins, Indianapolis, Ind., assignor to Prest-O-Lite Battery Company, Inc., a corporation of Indiana Application April 20, 1936, Serial No. 75,279

9 Claims. (Cl. 136—179).

My invention relates to improvements in storage batteries.

The improvements in the battery herein described are shown with reference to its use in aircraft, but it is understood that the invention is not limited to aircraft batteries nor to the specific embodiments herein illustrated and described.

Batteries such as are in common use in automobiles, are not adaptable for use in aircraft or for other uses where the battery is subject to a rotational displacement from its normal upright position.

The reasons for the above are twofold; firstly, the battery will not function if it is tipped so that the electrolyte runs out of the cells; and secondly, the presence of the corrosive electrolyte, sulphuric acid, will cause damage to the structural members and other parts of the aircraft. In connection with this latter objection, it is to be further observed that small quantities of the electrolyte escape the battery container in the form of small droplets, even when the battery is in upright position. Furthermore, the gases given off during the operation of the battery are highly undesirable because of their combustible or explosive nature.

An object of my invention is to provide a battery with gas venting means which will permit the battery to be tilted through any desired angle from its vertical position, or inverted, without danger of escape or leakage of the electrolyte.

A further object is to provide a battery with a one-piece cover of novel design which permits of manifolding the gases or escaping acid spray resulting from charging of the battery while in service.

A further object is to provide a linkless construction which offers the most direct path for the cell to cell circuit, and minimizes the danger of short circuiting.

A further object is to provide a battery with a non-spill vent which when open discharges gas and acid spray into the manifold formed in the cover.

A further object is to provide a battery with an acid-neutralizing chamber to make harmless such acid as may escape from the cells in the form of mist or spray.

A further object is to provide a battery with a single gas and liquid outlet whereby the escaping gases and any entrained moisture will be conducted away to any desirable point by suitable means provided for that purpose.

A further object is to provide a battery with a flash-proof manifold whereby any external flame is arrested before entering the interior of the battery.

Other objects, features and advantages will be apparent as the description proceeds.

In the accompanying drawings:

Fig. 1 is a front elevation cut away to show sections taken on lines A—A and B—B of Fig. 2.

Fig. 2 is a top plan view of the battery, partly in section.

Fig. 3 is a sectional view taken on line C—C of Fig. 2.

Fig. 4 is a detailed sectional view showing the intercell connector in the partially assembled condition.

Fig. 5 is a similar view taken on line B—B of Fig. 2 showing the completely assembled intercell connector.

Fig. 6 is an elevation, partly in section, showing an alternative construction of the acid level table.

Reference numeral 10 designates a storage battery casing or container having side walls 11, the lower portions thereof being of reduced thickness, as indicated at 12, end walls 13, bottom 14, and partitions 15 dividing the container into a number of chambers. The container 10 and the partitions 15 may be integrally molded from any suitable insulating acid-resisting material. Each of the chambers contains a plurality of negative plates 16 and positive plates 17 arranged alternately in the customary manner. Each plate is insulated from the adjacent plates by separators 18, of wood or other suitable insulating material, having sufficient porosity to permit rapid diffusion of the battery electrolyte.

Extending upwardly from the upper edge of each plate and spaced from the center thereof, is a lug 19. The plates of opposite polarity are so arranged that their lugs lie on opposite sides of the longitudinal axis of the container and at equal distances therefrom. Plate straps 20 serve to connect plates of like polarity in the usual manner by being welded to the lugs thereof. A cell post 21 is fused integrally with each strap 20 and extends upwardly therefrom. Said cell posts are preferably in the shape of discs, but they may be of any suitable configuration. Each post is provided with an aperture 22. Cell posts 21 are so arranged that when the elements are assembled into the cell chambers a post 21 will extend upwardly in contact with each side of a partition 15 and apertures 22 in the cell posts will be in registry with apertures 23 formed in said partitions. The posts on opposite sides of each partition will be of opposite polarity. A soft gum rubber sleeve or bushing 24 is cemented in aperture 23. It should be noted that the inside diameter of bushing 24 is slightly less than the diameter of aperture 22.

Intercell connection is effected by means of a connector 25 preferably made of lead, which extends through bushing 24 and is united at each end to a post 21 by being welded or burned thereto. The preferred manner of forming such a connection is illustrated in Figs. 4 and 5. As shown in Fig. 4, connector 25 in its original form is in the shape of a cylinder having both ends tapered. The diameter of the flat central portion of the connector is slightly greater than the inside diameter of bushing 24, but is smaller than the diameter of aperture 22 to allow it to pass freely therethrough. One end of connector 25 is inserted into either aperture 22 and the connector is pressed into a midway position with respect to bushing 24. In this position the flat central portion of the connector will be in contact with the inner surface of bushing 24, and because of the greater diameter of said portion, the bushing will be tightly compressed between said portion and the wall of aperture 23 in which the bushing is secured. Thus it will be apparent that a tight seal is formed between the wall of aperture 23 and the outer surface of bushing 24 and also between the inner surface of bushing 24 and connector 25. The ends of connector 25 are then united to posts 21 by being lead burned thereto in a suitable mold. It will be understood that terminal posts 26, one of which is provided at each end of the battery, are connected to their respective straps and extend upwardly through the cell cover in the usual manner.

The above described intercell connecting means is disclosed and claimed in my co-pending application Serial No. 59,588, filed January 17, 1936.

Closure of container 10 is effected by a cover 27 having depending outer and inner flanges 29 and 30, forming therebetween inverted grooves 28 and adapted to fit over side walls 11, end walls 13 and partitions 15. The outer flange 29 rests upon shoulder 31 formed on the exterior of said side and end walls at the upper edge thereof. The groove is somewhat wider than the partitions and walls over which it fits, to allow the introduction of the sealing compound 32. The transverse grooves are widened in the vicinity of aperture 23 in the partitions to accommodate cell posts 21.

It should be noted that inner flange 30 is of considerably greater height than outer flange 29, for a reason to be hereinafter described.

On its upper surface cover 27 is provided with a hollow longitudinally disposed thickened portion, the hollow interior of which serves as a manifold chamber 36 which chamber is in communication with each aperture 33. Said chamber is slightly wider than said apertures to provide a free space which will completely surround each plug 35 positioned therein, and threaded as at 34. Each plug 35 is recessed to form a chamber 35—A and is provided with an opening 37 at the bottom thereof, formed as a valve seat. A small passageway 38 is formed in the side of each plug, connecting the interior thereof with the manifold chamber 36.

Adapted to fit valve seat 37 is a valve 39 connected to one end of a flexible rubber valve stem 40 which extends upwardly through opening 37 and at its other end is connected to a weight 41. As shown, weight 41 is in the form of a truncated lead cone hollowed out in the lower portion thereof to raise its center of gravity. Valve 39, valve stem 40 and weight 41 are so proportioned that when the battery is in the upright position and the weight occupies the position illustrated in Figure 1 of the drawings, the valve will be spaced downwardly from seat 37 to permit of the egress of gases from the cell. Slots 42 are provided in the base of the cone 41 to afford communication between the interior of the cell and chamber 35—A when valve 39 is open. Chamber 35—A is closed by a cap 43 which is removable to allow insertion or replacement of cone 41. Gasket 44 provides a vapor-tight seal between plug 35 and battery cover 27.

A chamber 45, substantially coextensive in length with manifold chamber 36 and preferably of cylindrical cross-section, is formed on the upper surface of cover 27 in parallel relationship with said manifold chamber and adjacent thereto. The ends of chamber 45 are threaded as at 46. The interior of the chamber is provided at its central portion with an annual shoulder 47, and is adapted to receive a pair of tubes 48 preferably made of glass and containing an acid-neutralizing substance 49, as for example calcium carbonate, one of which is inserted through each open end of said chamber. The inner end of each tube rests against shoulder 47. Plugs 50, which are threaded into the open ends of chamber 45, serve to close said chamber and also to hold said tubes firmly against shoulder 47. A perforated hard rubber sleeve 51 and a soft rubber disc 52 are interposed between each plug and the tube as shown in Figure 2 of the drawings. The neutralizing chemical contained in glass tubes 48 is held therein by perforated rubber stoppers 51—a.

Communication from the manifold chamber to the neutralizing chamber is afforded through short transverse passages 53, one of which is provided at each end of the manifold chamber. An outlet tube 54 positioned centrally of neutralizing chamber 45 and in communication therewith, may be utilized to conduct the escaping gases and entrained moisture to any desired remote point.

Reference numeral 56 designates the acid-level table, held positively against separators 18 by cover flange 30. The acid-level table provides facile means of determining the level of the acid, and the two side walls thereof, 57, act as baffles or splash plates, tending to keep the acid away from venting aperture 37. An alternative construction wherein the acid level table 58 is formed integrally with the cover 27 is shown in Fig. 6.

In order to give a clearer understanding of the above-described embodiment of my invention, a short résumé of the novel features and their function is now given.

Gas and minute droplets of electrolyte, sulphuric acid, pass out of each cell through aperture 37 and plug 35 into manifold chamber 36, thence through passageways 53 and perforations in sleeve 51 to the interior of glass tubes 48. Here the acid is neutralized by the following reaction:

$$CaCO_3 + H_2SO_4 \rightarrow CaSO_4 + H_2O + CO_2$$

When the chemically active substance has been spent or exhausted, the tube containing the same may be removed and another tube containing a fresh reagent inserted in its place.

From each tube 48, gases pass out through the single vent 54 and thence may be directed away from the battery or outside of the aircraft in this particular instance. Upon tilting the battery to an angle of about 45° away from the vertical position, the conical weight 41 falls or slides to one side and then tilts, closing the valve 39, thereby shutting off escape of the electrolyte. Similarly, the valve will remain closed if the battery is inverted. This feature makes the battery peculiarly well adapted for aircraft use.

In assembling the battery the plates are first assembled in the usual manner, burned to the straps 20 and placed in the cell chambers. Intercell connections are then made by inserting the connector in the two cell posts and through the partition, and burning the connector and the two cell posts together, thereby making a fluid-tight electrical connection through the partition. The cover is affixed to the container by inverting them both and filling grooves 28 with a sealing compound and then the top edges of the container walls and partitions are forced down into the sealing compound until the cover is fully seated on the container. When these top edges enter the sealing groove and meet the sealing compound, displacement of the sealing compound occurs and it will flow upwardly and fill the space between the cover and the container surfaces. The electrolyte can then be introduced into the battery cells through apertures 34.

The cover flanges, 29 and 30, are of unequal length, the shorter being the exterior flange. If a crack or break develops in the sealing compound, which seals the flanges to the side and end walls, the electrolyte may force its way thereinto by capillary action. It will not flow continuously, however, to the exterior of the cell wall, for the break forms a syphon of which the longer leg is on the interior side, consequently the tendency is for the electrolyte to flow back into the cell.

It will be noted that the side walls are undercut beneath the top rim of the battery container as shown by reference numeral 12, thereby permitting the container to hold an increased volume of electrolyte without increasing the over-all dimensions of the battery.

It will be understood that the above described embodiment of the invention is not intended to restrict the invention to the precise details shown, except as limited by the appended claims.

What I claim as my invention is:

1. A storage battery comprising a plurality of cells, a container therefor having a one-piece hollow top providing a manifold chamber, the wall of said manifold chamber having ports therein each communicating with one of said cells, closure means for said ports having venting means to permit the escape of gases therefrom, a normally open valve associated with each of said closure means, means for closing said valves when said container is tilted from its normal upright position, and an acid neutralizing chamber in open communication with said manifold chamber.

2. A storage battery comprising a plurality of cells, a container therefor having a one-piece hollow top providing a manifold chamber, the wall of said manifold chamber having ports therein each communicating with one of said cells, closure means for said ports having venting means to permit the escape of gases therefrom, a normally open valve associated with each of said closure means, means for closing said valves when said container is tilted from its normal upright position, and a container for an acid neutralizing chemical removably associated with said cover and in communication with said manifold chamber.

3. A storage battery comprising a plurality of cells, a container therefor having a one-piece hollow top providing a manifold chamber, the wall of said manifold chamber having ports therein each communicating with one of said cells, closure means for said ports having venting means to permit the escape of gases therefrom, a normally open valve associated with each of said closure means, means for closing said valves when said container is tilted from its normal upright position, a neutralizing chamber communicating with said manifold chamber, a removable closure therefor, and a replaceable container for an acid neutralizing chemical received within said neutralizing chamber whereby said chemical may be renewed from time to time.

4. A storage battery comprising a plurality of cells, a container therefor having a one-piece hollow top providing a manifold chamber, the wall of said manifold chamber having ports therein each communicating with one of said cells, closure means for said ports having venting means to permit the escape of gases therefrom, a normally open valve associated with each of said closure means, means for closing said valves when said container is tilted from its normal upright position, an acid neutralizing chamber in open communication with said manifold chamber, and a vent for said neutralizing chamber.

5. A storage battery comprising a plurality of cells, a container therefor having a one-piece hollow top providing a manifold chamber, the wall of said manifold chamber having ports therein each communicating with one of said cells, closure means for said ports having venting means to permit the escape of gases therefrom, a normally open valve associated with each of said closure means, means for closing said valves when said container is tilted from its normal upright position, an acid neutralizing chamber having a port in communication with said manifold chamber and having a second port in communication with the atmosphere, and acid-neutralizing means interposed between said ports in the path of the escaping gases.

6. A storage battery comprising a container having partitions dividing said container into a plurality of compartments, a battery cell in each compartment, a one-piece cover for said container having an elongated longitudinally-extending recess and a plurality of vertical recesses, one of said latter recesses being in registry with each of said compartments, a vent-plug in each of said vertical recesses having a depending skirt portion extending through said longitudinal recess, said skirt portion being perforated to allow gases from each cell to escape into said longitudinal recess, said cover being provided with a second longitudinal recess and a passage-way affording communication from said first longitudinal recess to said second longitudinal recess, an outlet from said second longitudinal recess to the atmosphere and acid-neutralizing means positioned in said second longitudinal recess between said passageway and said outlet.

7. A storage battery comprising a plurality of cells, a container therefor, a one piece cover for said container having a recess formed therein, said cover being provided with apertures in the lower wall of said recess, one aperture being in communication with each of said cells, and with apertures in the upper walls of said recess, each of which is in registry with one of said lower wall apertures, a removable closure member positioned in each of said upper wall apertures and extending to and closing the corresponding lower wall aperture, said recess and said closure members defining a completely enclosed manifold chamber, means for venting each cell through a closure member into said manifold chamber, and a vent for exhausting said gases to the atmosphere in communication with said manifold chamber.

8. A storage battery comprising a plurality of cells, a container therefor, a one piece cover for said container having a recess formed therein, said cover being provided with apertures in the lower wall of said recess, one aperture being in communication with each of said cells, and with apertures in the upper walls of said recess, each of which is in registry with one of said lower wall apertures, a removable closure member positioned in each of said upper wall apertures and extending to and closing the corresponding lower wall aperture, said recess and said closure members defining a completely enclosed manifold chamber, means for venting each cell through a closure member into said manifold chamber including a normally open valve associated with each closure member, and means for closing said valve when said container is tilted from its normal upright position, and a vent for exhausting said gases to the atmosphere in communication with said manifold chamber.

9. A storage battery comprising a plurality of cells, a closed container having a one piece hollow cover providing a manifold common to and in communication with each of said cells to receive gases escaping therefrom, said manifold having upper, lower, side and end walls, aligned openings in said upper and lower walls above each cell, means for closing said openings, said means including passages for venting each cell into the manifold chamber, said cover having a second hollow portion forming an enclosed chamber having a port communicating with said manifold and a vent communicating with the atmosphere, and acid-neutralizing means interposed between said port and said vent in the path of the escaping gases.

MARK A. HOPKINS.